US010316691B2

(12) United States Patent
Murayama (10) Patent No.: US 10,316,691 B2
(45) Date of Patent: Jun. 11, 2019

(54) BEARING STRUCTURE AND TURBOCHARGER

(71) Applicant: IHI Corporation, Koto-ku (JP)

(72) Inventor: Tomokazu Murayama, Tokyo (JP)

(73) Assignee: IHI Corporation, Koto-ku (JP)

( * ) Notice: Subject to any disclaimer, the term of this patent is extended or adjusted under 35 U.S.C. 154(b) by 360 days.

(21) Appl. No.: 15/358,682

(22) Filed: Nov. 22, 2016

(65) Prior Publication Data

US 2017/0074113 A1  Mar. 16, 2017

Related U.S. Application Data

(63) Continuation of application No. PCT/JP2015/064494, filed on May 20, 2015.

(30) Foreign Application Priority Data

Jun. 2, 2014 (JP) ................................. 2014-114155

(51) Int. Cl.
*F01D 25/04* (2006.01)
*F04D 29/053* (2006.01)
(Continued)

(52) U.S. Cl.
CPC .............. *F01D 25/04* (2013.01); *F01D 5/04* (2013.01); *F01D 25/16* (2013.01); *F01D 25/18* (2013.01);
(Continued)

(58) Field of Classification Search
CPC .... F04D 29/063; F04D 29/056; F04D 29/053; F04D 29/668; F04D 29/4206;
(Continued)

(56) References Cited

U.S. PATENT DOCUMENTS 4,668,105 A * 5/1987 Furukawa ............. F01D 25/164
384/535
4,721,398 A * 1/1988 Miyashita ............. F01D 25/164
384/466
(Continued)

FOREIGN PATENT DOCUMENTS

CN 102678201 A 9/2012
CN 103089348 A 5/2013
(Continued)

OTHER PUBLICATIONS

Combined Office Action and Search Report dated Jun. 19, 2018 in Chinese Patent Application No. 201580027322.8 with English translation of categories of cited documents, citing documents AO and AP therein, 7 pages.
(Continued)

*Primary Examiner* — Igor Kershteyn
(74) *Attorney, Agent, or Firm* — Oblon, McClelland, Maier & Neustadt, L.L.P.

(57) ABSTRACT

An oil film damper of a bearing structure is located between facing surfaces of two bearings. The oil film damper includes two protrusions protruding inward in a radial direction from an inner circumferential surface of a main body portion, an oil guiding passage penetrating through from the protrusion to an outer circumferential surface of the main body portion and guiding a lubricating oil from the outer circumference of the main body portion to the bearing, an inclined surface provided on a side opposite to the adjacent surface adjacent to the bearing in the protrusion and having an inner diameter gradually increasing as the diameter is separate from the adjacent surface in the rotation axis direction of the shaft, and an oil discharge hole provided between the two protrusions of the main body portion and
(Continued)

discharging the lubricating oil to an outside from an inside of the main body portion.

7 Claims, 4 Drawing Sheets

(51) Int. Cl.

| | | |
|---|---|---|
| F16C 33/66 | (2006.01) | |
| F16C 19/54 | (2006.01) | |
| F16C 27/04 | (2006.01) | |
| F01D 5/04 | (2006.01) | |
| F01D 25/16 | (2006.01) | |
| F01D 25/18 | (2006.01) | |
| F01D 25/24 | (2006.01) | |
| F02B 33/40 | (2006.01) | |
| F04D 29/056 | (2006.01) | |
| F04D 29/063 | (2006.01) | |
| F04D 29/28 | (2006.01) | |
| F04D 29/42 | (2006.01) | |
| F04D 29/66 | (2006.01) | |
| F16C 35/077 | (2006.01) | |
| F16C 19/16 | (2006.01) | |

(52) U.S. Cl.
CPC .............. *F01D 25/24* (2013.01); *F02B 33/40* (2013.01); *F04D 29/053* (2013.01); *F04D 29/056* (2013.01); *F04D 29/063* (2013.01); *F04D 29/284* (2013.01); *F04D 29/4206* (2013.01); *F04D 29/668* (2013.01); *F16C 19/548* (2013.01); *F16C 27/045* (2013.01); *F16C 33/6659* (2013.01); *F05D 2220/40* (2013.01); *F05D 2240/60* (2013.01); *F16C 19/163* (2013.01); *F16C 35/077* (2013.01); *F16C 2360/24* (2013.01)

(58) Field of Classification Search
CPC ........ F04D 29/284; F01D 25/04; F01D 25/16; F01D 25/18; F01D 25/24; F01D 5/04; F16C 19/548; F16C 19/163; F16C 27/045; F16C 27/33; F16C 27/6659; F16C 35/077; F16C 2360/24; F05D 2220/40; F05D 2240/60; F02B 33/40
See application file for complete search history.

(56) References Cited

U.S. PATENT DOCUMENTS

| | | | | |
|---|---|---|---|---|
| 4,943,170 | A * | 7/1990 | Aida | .................... F01D 25/164 384/518 |
| 6,499,884 | B1 * | 12/2002 | Svihla | .................. F01D 25/162 384/138 |
| 8,628,247 | B2 | 1/2014 | Uesugi | |
| 2006/0083448 | A1 * | 4/2006 | Alam | .................... F01D 25/164 384/99 |
| 2009/0081040 | A1 * | 3/2009 | Ueno | .................... F16C 19/55 415/229 |
| 2013/0220285 | A1 | 8/2013 | Hayashi et al. | |
| 2014/0069096 | A1 * | 3/2014 | Murayama | .............. F02B 37/16 60/611 |
| 2014/0366530 | A1 * | 12/2014 | Murayama | ............ F02B 37/183 60/602 |
| 2015/0044033 | A1 * | 2/2015 | Murayama | ............ F02B 37/183 415/145 |
| 2015/0315932 | A1 * | 11/2015 | Ryu | .................... F01D 25/166 384/108 |

FOREIGN PATENT DOCUMENTS

| | | |
|---|---|---|
| JP | 1-159133 U | 11/1989 |
| JP | 2004-108450 | 4/2004 |
| JP | 2006-125485 A | 5/2006 |
| JP | 2009-270613 | 11/2009 |
| JP | 2011-220273 | 11/2011 |
| JP | 2012-102700 | 5/2012 |
| JP | 2012-167606 | 9/2012 |
| JP | 2013-177852 | 9/2013 |
| JP | 2014-20461 | 2/2014 |
| JP | 2014-58936 | 4/2014 |

OTHER PUBLICATIONS

International Search Report dated Aug. 4, 2015 in PCT/JP2015/064494, filed on May 20, 2015 ( with English Translation).
Written Opinion dated Aug. 4, 2015 in PCT/JP2015/064494, filed on May 20, 2015.
Office Action dated Aug. 29, 2017 in Japanese Patent Application No. 2016-525763.

* cited by examiner

BEARING STRUCTURE AND TURBOCHARGER

CROSS REFERENCE TO RELATED APPLICATIONS

This application is a continuation application of International Application No. PCT/JP2015/064494, filed on May 20, 2015, which claims priority to Japanese Patent Application No. 2014-114155, filed on Jun. 2, 2014, the entire contents of which are incorporated by reference herein.

BACKGROUND

1. Technical Field

The present disclosure relates to a bearing structure including an oil film damper for suppressing oscillation of a shaft and to a turbocharger.

2. Description of the Related Art

Conventionally, a turbocharger is known in which a shaft with a turbine wheel provided on one end and a compressor wheel provided on the other end is rotatably supported by a bearing housing. Such a turbocharger is connected to an engine, and the turbine wheel is rotated by an exhaust gas discharged from the engine, while the compressor wheel is rotated through the shaft by rotation of this turbine wheel. As described above, the turbocharger compresses air with rotation of the compressor wheel and sends it out to the engine.

Japanese Patent Application Laid-Open Publication No. 2014-020461 (Patent Literature 1) describes constitution in which a rolling bearing supporting the shaft is supported on an inner side of the oil film damper. The oil film damper has a cylindrical shape and is fitted in a hole formed in a housing of the turbocharger, and an oil film of a lubricating oil is formed between an inner circumferential surface of the hole and an outer circumferential surface of the oil film damper. This oil film suppresses oscillation of the shaft.

SUMMARY

In the oil film damper, an oil guiding passage penetrating through from the outer circumferential surface to an inner circumferential surface and guiding the lubricating oil to the rolling bearing is formed. The lubricating oil lubricates the rolling bearing and then, is discharged to an outside of the oil film damper through an oil discharge hole formed on a vertically lower side of the oil guiding passage. At this time, if the lubricating oil is not discharged rapidly but remains in the oil film damper, it makes resistance against rotation of the shaft and increases mechanical loss or lowers a flow rate of the lubricating oil and affects cooling performances and thus, improvement of oil discharging performances of the oil film damper is in demand.

An object of the present disclosure is to provide a bearing structure and a turbocharger which can improve the oil discharging performances.

A first aspect of the present disclosure is a bearing structure rotatably supporting a shaft, which includes an oil film damper accommodated in a bearing hole formed in a housing and having a cylindrical main body portion and two bearings held in the main body portion of the oil film damper, the bearings being arranged facing and separated from each other in a rotation axis direction of the shaft. The oil film damper is located between facing surfaces mutually facing each other of the two bearings. The oil film damper includes two protrusions protruding inward in a radial direction from an inner circumferential surface of the main body portion and being adjacent to each of the facing surfaces of the two bearings, an oil guiding passage penetrating through from the protrusion to an outer circumferential surface of the main body portion and guiding a lubricating oil from an outer circumference of the main body portion to the bearing, an inclined surface provided on a side opposite to an adjacent surface adjacent to the bearing in the protrusion and having an inner diameter gradually increasing as the diameter is separate from the adjacent surface to a rotation axis direction of the shaft, and an oil discharge hole provided between the two protrusions in the main body portion and discharging the lubricating oil to an outside from an inside of the main body portion.

The oil guiding passage may extend linearly to a direction inclined with respect to the rotation axis direction of the shaft.

The oil guiding passage may extend in parallel with the inclined surface.

The protrusion has a curved portion continuing to an end portion on an inner side in the radial direction in the adjacent surface and having a curvature center on a side opposite to the side where the bearing adjacent to the adjacent surface is located with reference to the adjacent surface, and the oil guiding passage may be opened in the curved portion.

A second aspect of the present disclosure is a turbocharger which includes a housing in which a bearing hole is formed, a shaft having a turbine wheel provided on one end side and a compressor wheel provided on the other end side; an oil film damper accommodated in the bearing hole and having a cylindrical main body portion, and two bearings held in the main body portion of the oil film damper, the bearings being arranged facing and separated from each other in a rotation axis direction of the shaft and rotatably supporting the shaft. The oil film damper is located between the facing surfaces facing mutually with each other of the two bearings. The oil film damper includes two protrusions protruding inward in a radial direction from an inner circumferential surface of the main body portion and being adjacent to each of the facing surfaces of the two bearings, an oil guiding passage penetrating through from the protrusion to an outer circumferential surface of the main body portion and guiding a lubricating oil from an outer circumference of the main body portion to the bearing, an inclined surface provided on a side opposite to an adjacent surface adjacent to the bearing in the protrusion and having an inner diameter gradually increasing as the diameter is separate from the adjacent surface to a rotation axis direction of the shaft, and an oil discharge hole provided between the two protrusions in the main body portion and discharging the lubricating oil to an outside from an inside of the main body portion.

According to the present disclosure, the oil discharging performances can be improved.

DESCRIPTION OF THE EMBODIMENTS

An embodiment of the present disclosure will be described below in detail by referring to the attached drawings. Dimensions, materials and other specific numerical values and the like illustrated in such an embodiment are only exemplification for facilitation of understanding of the disclosure and do not limit the present disclosure unless otherwise specified. In this Description and drawings, elements having substantially the same functions and constitutions are given the same reference numerals, and duplicated explanation will be omitted, and elements not directly relating to the present disclosure are not illustrated.

Figure 1:
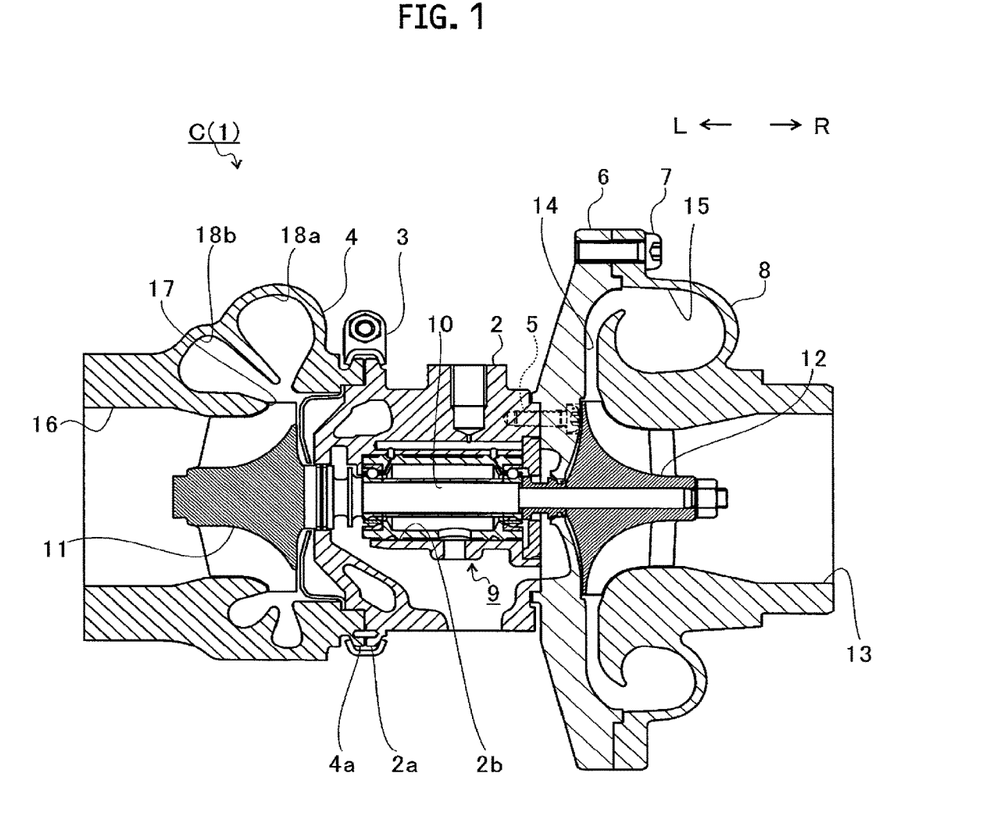
FIG. 1 is an outline sectional view of a turbocharger according to an embodiment of the present disclosure.

FIG. 1 is an outline sectional view of a turbocharger C. In the following, it is assumed that an arrow L illustrated in FIG. 1 is a direction indicating a left side of the turbocharger C and an arrow R is a direction indicating a right side of the turbocharger C in the explanation. As illustrated in FIG. 1, the turbocharger C includes a turbocharger main body 1. This turbocharger main body 1 has a bearing housing 2, a turbine housing 4 connected to a left side of the bearing housing 2 by a fastening mechanism 3, a seal plate 6 connected to a right side of the bearing housing 2 by a fastening bolt 5, and a compressor housing 8 connected to a right side of the seal plate 6 by a fastening bolt 7. They are integrated.

On an outer circumferential surface in a vicinity of the turbine housing 4 of the bearing housing 2, a projection 2a is provided. The projection 2a projects to a radial direction of the bearing housing 2. On an outer circumferential surface in a vicinity of the bearing housing 2 of the turbine housing 4, a projection 4a is provided. The projection 4a projects in a radial direction of the turbine housing 4. The bearing housing 2 and the turbine housing 4 are fixed by band-fastening the projections 2a and 4a by the fastening mechanism 3. The fastening mechanism 3 is constituted by a coupling (a G-coupling, for example) for sandwiching the projections 2a and 4a.

A bearing hole 2b penetrating through the turbocharger C in a right-and-left direction is formed in the bearing housing 2. In the bearing hole 2b, a bearing structure 9 is provided. The bearing structure 9 rotatably supports a shaft 10. A turbine wheel 11 is integrally fixed to a left end portion (one end, one end side) of the shaft 10. The turbine wheel 11 is rotatably accommodated in the turbine housing 4. A compressor wheel 12 is integrally fixed to a right end portion (the other end, the other end side) of the shaft 10. The compressor wheel 12 is rotatably accommodated in the compressor housing 8.

An intake port 13 is formed in the compressor housing 8. The intake port 13 is opened on the right side of the turbocharger C and is connected to an air cleaner (not shown). In a state where the seal plate 6 and the compressor housing 8 are connected by the fastening bolt 7, the facing surfaces mutually facing each other of the seal plate 6 and the compressor housing 8 form a diffuser flow path 14 which raises a pressure of air. The diffuser flow path 14 is formed annularly from an inner side to an outer side in a radial direction of the shaft 10. The diffuser flow path 14 communicates with the intake port 13 through the compressor wheel 12 on the inner side in the radial direction.

A compressor scroll flow path 15 is provided in the compressor housing 8. The compressor scroll flow path 15 is formed annularly and is located on the outer side in the radial direction of the shaft 10 from the diffuser flow path 14. The compressor scroll flow path 15 communicates with an intake port (not shown) of the engine. Moreover, the compressor scroll flow path 15 communicates also with the diffuser flow path 14. Therefore, when the compressor wheel 12 is rotated, the air is suctioned into the compressor housing 8 from the intake port 13, accelerated by an action of a centrifugal force in a process of flowing through blades of the compressor wheel 12, boosted by the diffuser flow path 14 and the compressor scroll flow path 15 and led to the intake port of the engine.

A discharge port 16 is formed in the turbine housing 4. The discharge port 16 is opened on the left side of the turbocharger C and is connected to an exhaust gas purifying device (not shown). Moreover, a flow path 17 and annular turbine scroll flow paths 18a and 18b located on the outer side in the radial direction of the turbine wheel 11 from this flow path 17 are also provided in the turbine housing 4. The turbine scroll flow paths 18a and 18b communicate with a gas inlet (not shown) to which the exhaust gas discharged from an exhaust manifold (not shown) of the engine is led. Moreover, the turbine scroll flow paths 18a and 18b communicate also with the flow path 17. Therefore, the exhaust gas is led from the gas inlet to the turbine scroll flow paths 18a and 18b and is led to the discharge port 16 through the flow path 17 and the turbine wheel 11. In this flow process, the exhaust gas rotates the turbine wheel 11.

The turbocharger C of this embodiment has the two turbine scroll flow paths 18a and 18b. In a low-speed region, the exhaust gas flows into only one of the two turbine scroll flow paths 18a and 18b. As a result, a pressure of the exhaust gas required for rotating the turbine wheel 11 is ensured.

A rotating force of the turbine wheel 11 is transmitted to the compressor wheel 12 through the shaft 10, whereby the compressor wheel 12 is rotated. The air is boosted by the rotating force of this compressor wheel 12 and is led to the intake port of the engine.

Figure 2A:
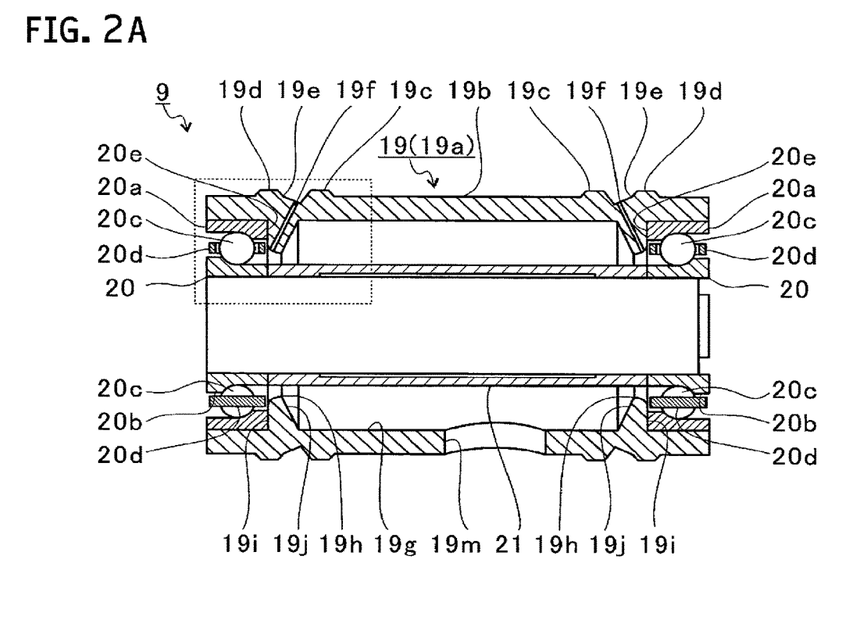
FIG. 2A is view illustrating a bearing structure in FIG. 1.
Figure 2B:
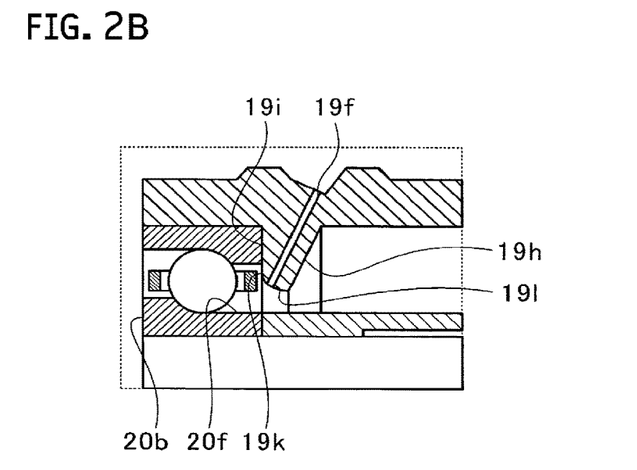
FIG. 2B is a view illustrating an inside of a broken line in FIG. 2A.
Figure 3:
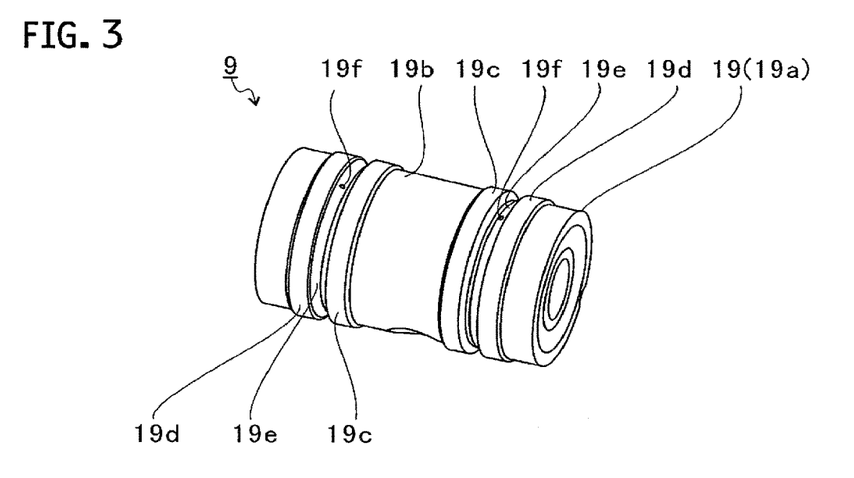
FIG. 3 is a perspective view of an oil film damper according to the embodiment of the present disclosure.

FIG. 2A and FIG. 2B are explanatory views for explaining the bearing structure 9. FIG. 2A illustrates the bearing structure 9 in FIG. 1, and FIG. 2B illustrates an inside of a broken line in FIG. 2A. Moreover, FIG. 3 is a perspective view of an oil film damper 19. As illustrated in FIG. 2A, in the bearing structure 9, the oil film damper 19 is accommodated in the bearing hole 2b formed in the bearing housing 2.

As illustrated in FIG. 3, the oil film damper 19 has a cylindrical main body portion 19a. Projections 19c and 19d are provided on an outer circumferential surface 19b of the main body portion 19a. The projections 19c and 19d project toward the outer side in the radial direction of the main body portion 19a and are formed annularly. The projections 19c and 19d are provided respectively on both end sides of the shaft 10 in a rotation axis direction of the shaft 10 (hereinafter referred to simply as an axial direction). These annual projections 19c and 19d face an inner circumferential surface of the bearing hole 2b. As a result, an oil film is formed between the annular projections 19c and 19d and the inner circumferential surface of the bearing hole 2b, and oscillation of the shaft 10 is suppressed by this oil film.

As illustrated in FIG. 2A, a tapered surface 19e is formed between the two annular projections 19c and 19d. The tapered surface 19e is inclined to the axial direction. An oil guiding passage 19f is formed in the tapered surface 19e of the main body portion 19a. The oil guiding passage 19f extends perpendicularly to the tapered surface 19e and communicates with an inside of the main body portion 19a.

As illustrated in FIG. 2A, the oil guiding passage 19f leads the lubricating oil to a rolling bearing (hereinafter referred to as a bearing for convenience of explanation) 20 accommodated inside the main body portion 19a. The bearings 20 are accommodated one each in both end sides in the axial direction of the shaft 10 inside the main body portion 19a. The two bearings 20 are provided separate from each other in the axial direction and surfaces (facing surfaces) 20e of outer rings 20a are disposed so as to face each other in the axial direction.

The bearing 20 has the outer ring 20a and an inner ring 20b with a diameter smaller than the outer ring 20a and has a plurality of balls 20c sandwiched between the outer ring 20a and the inner ring 20b and a holder 20d holding the plurality of balls 20c. Each of the balls 20c is provided in a circumferential direction of the outer ring 20a (inner ring 20b) and held by the holder 20d.

The outer ring 20a is fixed to the oil film damper 19, while the inner ring 20b is integrally rotated with the shaft 10. At this time, rolling of the balls 20c suppresses friction resistance against the outer ring 20a and the inner ring 20b, and relative rotation of the outer ring 20a and the inner ring 20b is enabled. As described above, the shaft 10 is rotatably supported by the rolling bearing 20.

A regulating portion 21 is disposed between the two inner rings 20b. The regulating portion 21 is a member formed annularly (tubularly). The shaft 10 is inserted into the regulating portion 21. Moreover, both ends of the regulating portion 21 in the axial direction are in contact with the inner rings 20b, respectively. The regulating portion 21 regulates movement in a proximate direction of the two inner rings 20b while integrally rotating with the inner rings 20b.

Two protrusions 19h and 19h are formed on an inner circumferential surface 19g of the oil film damper 19. Each of the protrusions 19h protrudes inward in the radial direction of the oil film damper 19 and is formed annularly. The two protrusions 19h are located between the facing surfaces 20e and 20e of the outer rings 20a and 20a in the two bearings 20 and 20. Each of the protrusions 19h is adjacent to the facing surface 20e of the outer ring 20a of the proximate bearing 20.

That is, the two bearings 20 and 20 are fitted in the main body portion 19a from each of the both end sides of the main body portion 19a until they abut against the protrusions 19h. The oil guiding passage 19f penetrates through from a tip on the inner side in the radial direction of the protrusion 19h to the tapered surface 19e through the protrusion 19h.

As illustrated in FIG. 2A, the protrusion 19h has an inclined surface 19j formed on a side opposite to an adjacent surface 19i adjacent to the bearing 20. An inner diameter of the inclined surface 19j gradually increases as the inner diameter is separate from the adjacent surface 19i in the axial direction. In this embodiment, the inclined surface 19j is in parallel with an extending direction of the oil guiding passage 19f in section including the rotating axis of the shaft 10.

As illustrated in FIG. 2B, the protrusion 19h has a curved portion 19l continuing to an end portion (inner-diameter side end portion) 19k on the inner side in the radial direction in the adjacent surface 19i and having a curvature center on a side opposite to the side where the bearing 20 adjacent to the adjacent surface 19i is located with reference to the adjacent surface 19i. The oil guiding passage 19f is opened in the curved portion 19l and passes through the curvature center of the curved portion 19l. The oil guiding passage 19f ejects the lubricating oil toward the outer circumferential surface 20f of the inner ring 20b in the bearing 20.

As illustrated in FIG. 2A, an oil discharge hole 19m is provided between the two protrusions 19h and 19h. In FIG. 2A, an upper side substantially matches a vertically upper side and a lower side to a vertically lower side, and the oil discharge hole 19m is formed on the vertically lower side from the oil guiding passage 19f. The lubricating oil is supplied to the bearing 20 from the oil guiding passage 19f and a part thereof hits the ball 20c or the like and rebounds and is discharged to the outside from the inside of the main body portion 19a through the oil discharge hole 19m.

Figure 4:
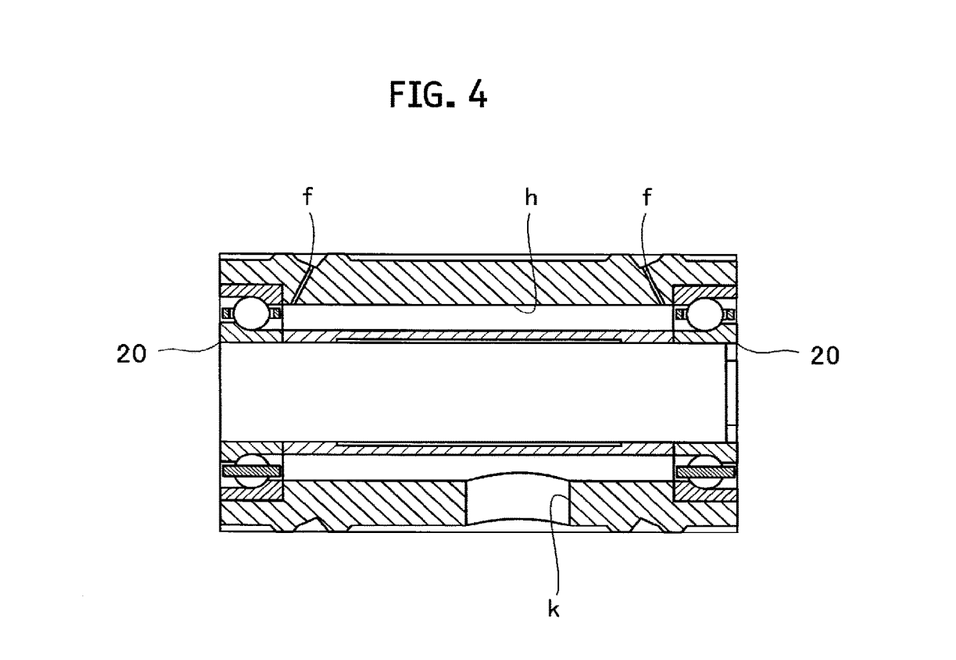
FIG. 4 is a view for explaining a comparative example.

FIG. 4 is an explanatory view for explaining a comparative example and illustrates a section of a portion corresponding to FIG. 2A in the aforementioned embodiment. As illustrated in FIG. 4, in the comparative example, a protrusion h extends in the axial direction from one of the bearings 20 to the other bearing 20. Thus, depending on the posture of the turbocharger, for example, the lubricating oil is supplied from the oil guiding passage f and hits the ball 20c or the like and rebounds and then, becomes difficult to flow toward the oil discharge hole k, which leads to a concern that the oil discharging performances lower.

In this embodiment, as illustrated in FIG. 2A and FIG. 2B, the two protrusions 19h and 19h are separated from each other, and the inclined surface 19j is provided on each of the protrusions 19h. Thus, the lubricating oil is supplied from the oil guiding passage 19f and hits the ball 20c or the like and rebounds and then, is led to the inclined surface 19j of the protrusion 19h and is rapidly discharged from the oil discharge hole 19m. As described above, the oil discharging performances can be improved in the bearing structure 9.

Moreover, the oil guiding passage 19f extends linearly in the direction inclined to the axial direction and perpendicular to the tapered surface 19e. Therefore, the oil guiding passage 19f can be formed by one session of drilling, whereby a working cost can be reduced.

Moreover, the oil guiding passage 19f extends in parallel with the inclined surface 19j. Therefore, the inclined surface 19j can have a shape obtained by reducing the thickness of the protrusion 19h to the minimum thickness that can maintain strength along the oil guiding passage 19f. That is, the thickness of the protrusion 19h in the axial direction can be thinned as thin as the strength will permit. Thus, a space for oil discharge can be ensured largely so as to improve the oil discharging performances and weight reduction can be realized. Moreover, since a space is ensured as large as possible on the outer side in the radial direction of the shaft 10, friction resistance against the lubricating oil caused by rotation of the shaft 10 can be alleviated. As a result, a mechanical loss of the bearing can be reduced.

Moreover, since the oil guiding passage 19f is opened in the curved portion 19l, the lubricating oil can be ejected in concentration toward a predetermined position (the outer circumferential surface 20f of the inner ring 20b in this embodiment, for example) of the bearing 20 while diffusion is suppressed.

Figure 5A:
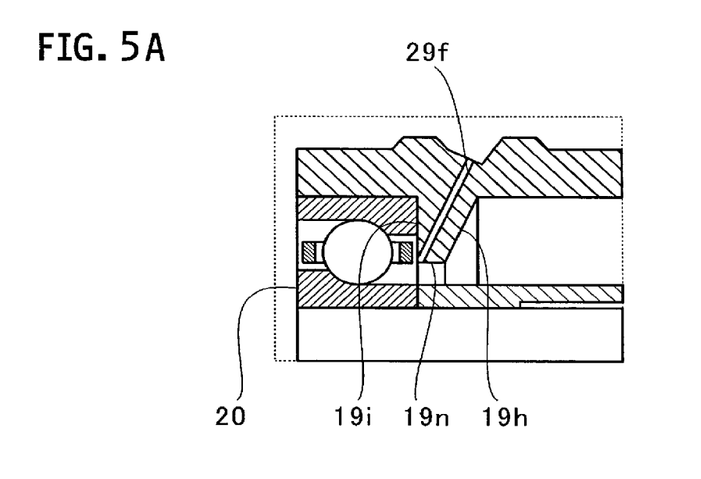
FIG. 5A and FIG. 5B are views for explaining modified examples of the embodiment of the present disclosure.
Figure 5B:
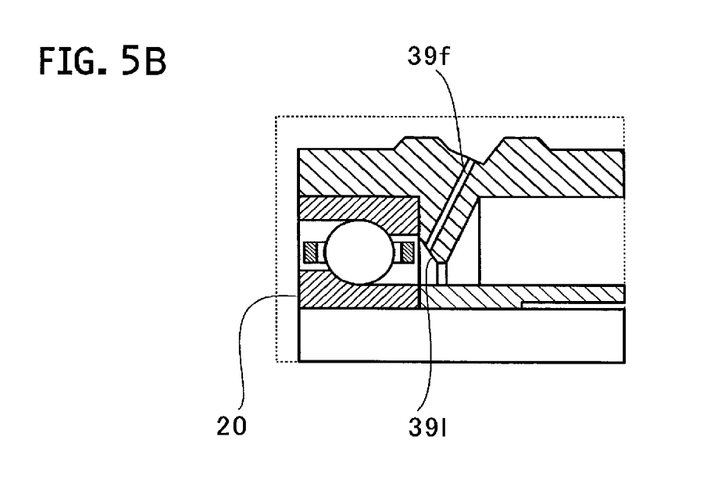

FIG. 5A and FIG. 5B are explanatory views for explaining modified examples of this embodiment and illustrate a section corresponding to the portion inside the broken line in FIG. 2A in the aforementioned embodiment. As illustrated in FIG. 5A, in a first modified example, the curved portion 19l as in the aforementioned embodiment is not provided. Moreover, the protrusion 19h has an innermost diameter portion 19n as an inner circumferential surface located on the innermost side in the radial direction. An oil guiding passage 29f of the first modified example is opened across each of the adjacent surface 19i and the innermost diameter portion 19n in the protrusion 19h.

In this case, too, similarly to the aforementioned embodiment, the lubricating oil can be ejected in concentration toward the predetermined position of the bearing 20 while diffusion is suppressed.

As illustrated in FIG. 5B, in a second modified example, a chamfered portion 39l is provided instead of the curved portion 19l. The chamfered portion 39l has a linear shape in a section (a section illustrated in FIG. 5B, for example) including the rotating axis of the shaft 10.

The chamfered portion 39*l* is not perpendicular to an oil guiding passage 39*f*. In other words, the oil guiding passage 39*f* does not extend perpendicularly to the chamfered portion 39*l*. That is, the oil guiding passage 39*f* may be inclined to the perpendicular direction of the chamfered portion 39*l*.

In any of the aforementioned embodiment, the first modified example, and the second modified example, by formation of the oil guiding passages 19*f*, 29*f*, and 39*f* perpendicular to the tapered surface 19*e*, drilling can be easily accomplished from the tapered surface 19*e* side. Moreover, inclination of the opening surface (curved portion 19*l*, chamfered portion 39*l* and the like) on the bearing 20 side may be finely adjusted in accordance with a supply mode of the lubricating oil to the bearing 20.

In the aforementioned embodiment and modified examples, the case where the oil guiding passages 19*f*, 29*f*, and 39*f* extend in parallel with the inclined surface 19*j* is described, but they may be inclined to the inclined surface 19*j*.

In the aforementioned embodiment, the case where the oil guiding passage 19*f* passes through the curvature center of the curved portion 19*l* is described but it does not have to pass through the curvature center of the curved portion 19*l*. In this case, similarly to the embodiment, the first modified example, and the second modified example, the lubricating oil can be ejected in concentration toward the predetermined position of the bearing 20 while diffusion is suppressed.

In the aforementioned second modified example, the case where the oil guiding passage 39*f* does not extend perpendicularly to the chamfered portion 39*l* is described, but it may extend perpendicularly to the chamfered portion 39*l*. In this case, similarly to the aforementioned embodiment, the lubricating oil can be ejected in concentration toward the predetermined position of the bearing 20 while diffusion is suppressed.

In the aforementioned first modified example, the case where the curved portion 19*l* or the chamfered portion 39*l* is not provided and the oil guiding passage 29*f* is opened in both of the adjacent surface 19*i* and the innermost diameter portion 19*n* in the protrusion 19*h* is described. However, the oil guiding passage 29*f* may be opened only in either one of the adjacent surface 19*i* and the innermost diameter portion 19*n*.

The embodiment of the present disclosure has been described above by referring to the attached drawings, but it is needless to say that the present disclosure is not limited to such an embodiment. It is obvious that those skilled in the art could conceive of various modified examples and modification examples within a range described in claims and it is understood that they naturally belong to the technical scope of the present disclosure.

What is claimed is:

1. A bearing structure rotatably supporting a shaft, comprising:
    an oil film damper accommodated in a bearing hole formed in a housing and having a cylindrical main body portion; and
    two bearings held in the main body portion of the oil film damper, the bearings being arranged facing and separated from each other in a rotation axis direction of the shaft,
    wherein the oil film damper is located between facing surfaces mutually facing each other of the two bearings; and
    wherein the oil film damper includes:
    two protrusions protruding inward in a radial direction from an inner circumferential surface of the main body portion and being adjacent to each of the facing surfaces of the two bearings;
    an oil guiding passage penetrating through from each protrusion to an outer circumferential surface of the main body portion and guiding a lubricating oil from an outer circumference of the main body portion to corresponding one of the bearings;
    an inclined surface provided on a side opposite to an adjacent surface adjacent to corresponding one of the bearings in each protrusion and having an inner diameter gradually increasing as the diameter is separate from the adjacent surface to a rotation axis direction of the shaft; and
    an oil discharge hole provided between the two protrusions in the main body portion and discharging the lubricating oil to an outside from an inside of the main body portion.

2. The bearing structure according to claim 1, wherein the oil guiding passage extends linearly to a direction inclined with respect to the rotation axis direction of the shaft.

3. The bearing structure according to claim 2, wherein the oil guiding passage extends in parallel with the inclined surface.

4. The bearing structure according to claim 1, wherein each protrusion has a curved portion continuing to an end portion on an inner side in the radial direction in the adjacent surface and having a curvature center on a side opposite to a side where the bearing adjacent to the adjacent surface is located with reference to the adjacent surface, and the oil guiding passage is opened in the curved portion.

5. The bearing structure according to claim 2, wherein each of the two protrusions has a curved portion continuing to an end portion on an inner side in the radial direction in the adjacent surface and having a curvature center on a side opposite to a side where the bearing adjacent to the adjacent surface is located with reference to the adjacent surface, and the oil guiding passage is opened in the curved portion.

6. The bearing structure according to claim 3, wherein each of the two protrusions has a curved portion continuing to an end portion on an inner side in the radial direction in the adjacent surface and having a curvature center on a side opposite to a side where the bearing adjacent to the adjacent surface is located with reference to the adjacent surface, and the oil guiding passage is opened in the curved portion.

7. A turbocharger comprising:
    a housing in which a bearing hole is formed;
    a shaft having a turbine wheel provided on one end side and a compressor wheel provided on the other end side;
    an oil film damper accommodated in the bearing hole and having a cylindrical main body portion; and
    two bearings held in the main body portion of the oil film damper, the bearings being arranged facing and separated from each other in a rotation axis direction of the shaft and rotatably supporting the shaft,
    wherein the oil film damper is located between facing surfaces mutually facing each other of the two bearings; and
    wherein the oil film damper includes:

two protrusions protruding inward in a radial direction from an inner circumferential surface of the main body portion and being adjacent to each of the facing surfaces of the two bearings;

an oil guiding passage penetrating through from each of the two protrusions to an outer circumferential surface of the main body portion and guiding a lubricating oil from an outer circumference of the main body portion to a corresponding one of the two bearings;

an inclined surface provided on a side opposite to an adjacent surface adjacent to the corresponding one of the two bearings in the each of the two protrusions and having an inner diameter gradually increasing as the diameter is separate from the adjacent surface to a rotation axis direction of the shaft; and an oil discharge hole provided between the two protrusions in the main body portion and discharging the lubricating oil to an outside from an inside of the main body portion.

* * * * *